Oct. 22, 1935.　　　　O. C. SCHMIDT　　　　2,018,618
MACHINE FOR TREATING MATERIAL
Filed Oct. 7, 1933　　　3 Sheets-Sheet 1
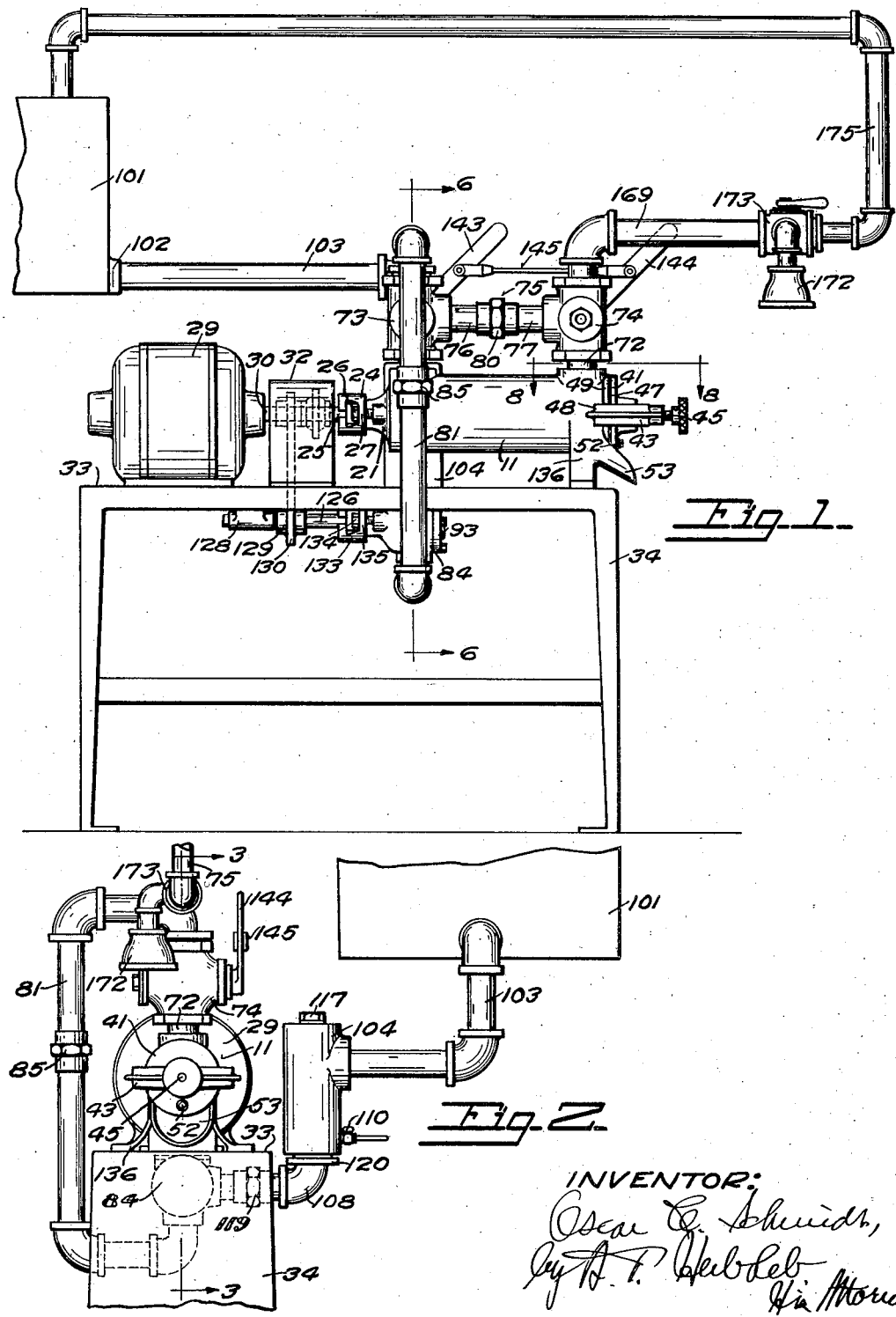

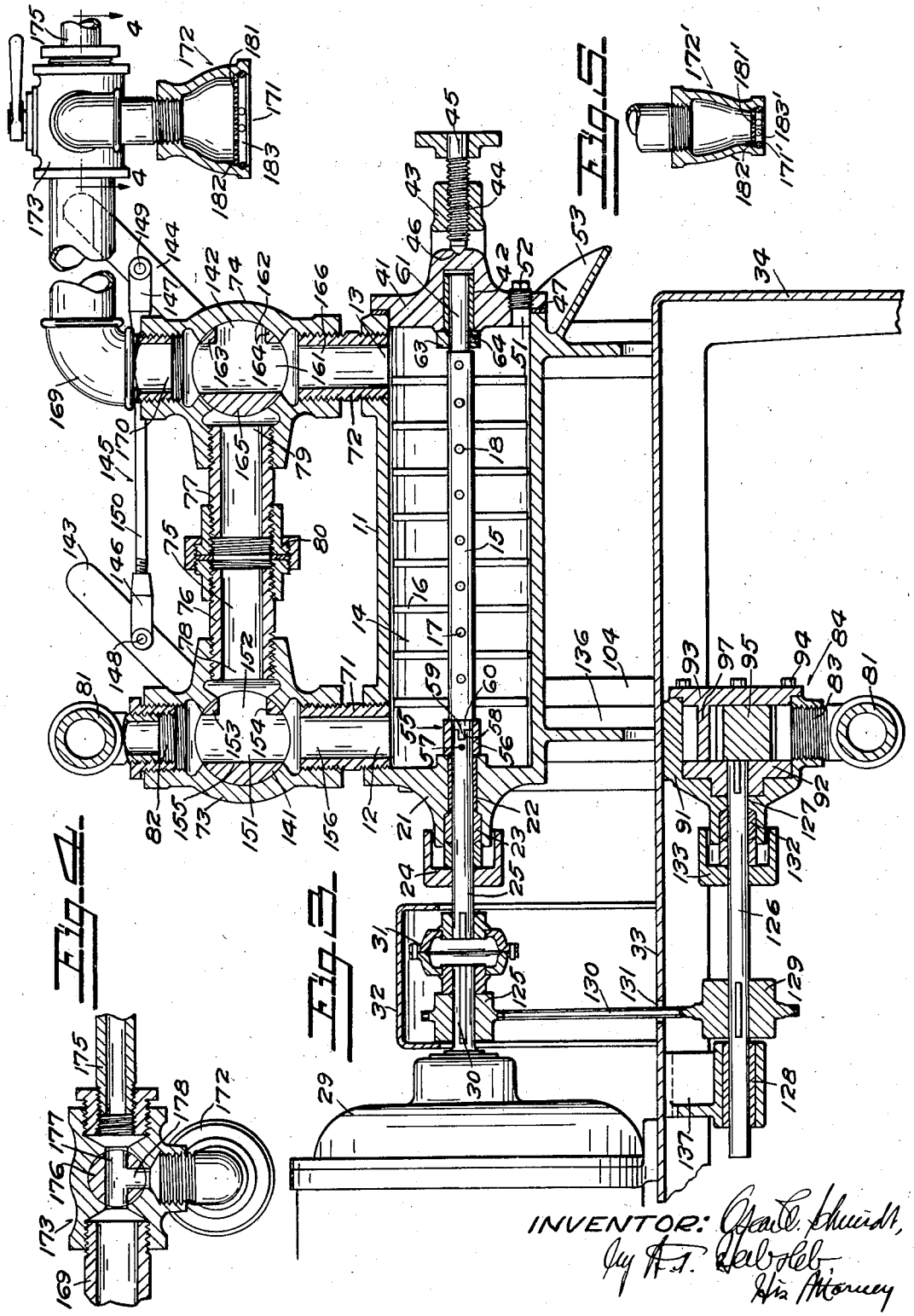

Oct. 22, 1935.    O. C. SCHMIDT    2,018,618
MACHINE FOR TREATING MATERIAL
Filed Oct. 7, 1933    3 Sheets-Sheet 3
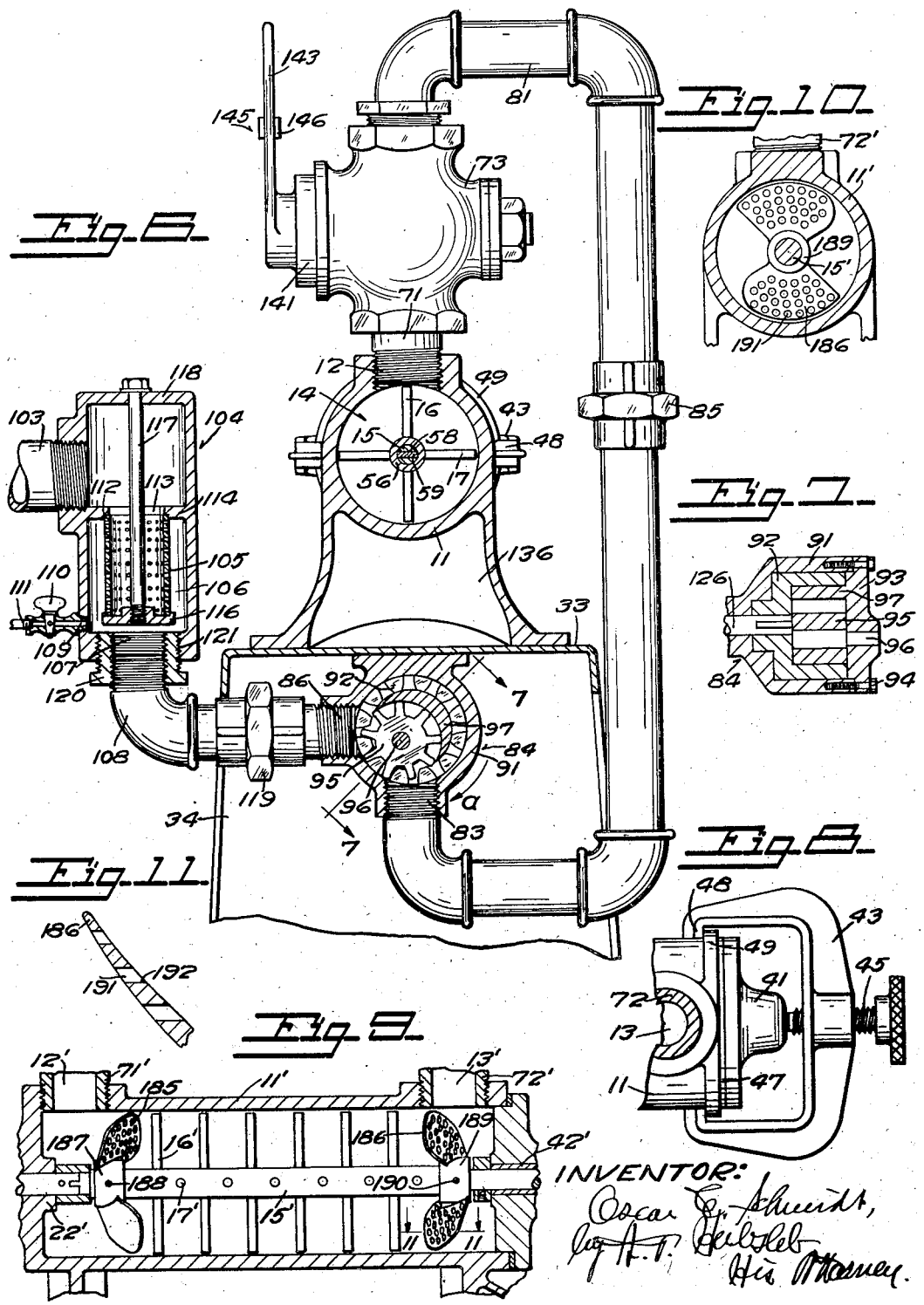

Patented Oct. 22, 1935

2,018,618

UNITED STATES PATENT OFFICE 2,018,618

MACHINE FOR TREATING MATERIAL

Oscar C. Schmidt, Cincinnati, Ohio, assignor to
The Cincinnati Butchers' Supply Company,
Cincinnati, Ohio, a corporation of Ohio Application October 7, 1933, Serial No. 692,685

19 Claims. (Cl. 259—10)

It is the object of my invention to provide novel means for treating material for making the same more uniform throughout the mass of the material, and to provide novel means for delivering the same.

My invention consists in novel means for thoroughly mixing the material; further, in novel means to render the same fluffy and homogeneous; and, further, in novel means for treating material so that a given weight of the same shall equal a given volume in finished condition.

My invention consists, further, in novel means whereby to agitate material, for instance, fatty substances, and, further, to by-pass the material, for delivering the material in agitated condition and in various proportions of agitated and unagitated conditions; and, further, in novel means for controlling the delivery of the completed material.

I have exemplified my invention applied to lard. Lard when rendered contains various elements, and is often lacking in the clear, white color desired. I have also found it desirable at times to mix air, nitrogen or other inert gas, or other substance, thoroughly into the lard, and my invention includes novel means for accomplishing this.

My invention will be further readily understood from the following description and claims, and from the drawings, in which latter:

Fig. 1 is a side elevation of my improved device, partly broken away.

Fig. 2 is an end elevation of the same, partly broken away.

Fig. 3 is an axial section of the same, taken on the line 3—3 of Fig. 2, and partly broken away.

Fig. 4 is a cross-section of one of the delivery valves, taken on the line 4—4 of Fig. 3.

Fig. 5 is a side elevation, partly broken away, and partly in axial section, showing a modified delivery spout.

Fig. 6 is a cross-section of my improved device, taken on the line 6—6 of Fig. 1, and partly broken away.

Fig. 7 is an axial section of the pump, taken in the plane of the line 7—7 of Fig. 6, and partly broken away.

Fig. 8 is a detail view of the clamping means for the outer end of the cylinder, partly in section on the line 8—8 of Fig. 1, and partly broken away.

Fig. 9 is an axial section of the cylinder exemplifying a modification of the agitating means.

Fig. 10 is a cross-section of the same taken in the plane of the line 10—10 of Fig. 9; and, Fig. 11 is a cross-sectional detail view taken on the line 11—11 of Fig. 9.

A cylinder 11 is provided with an inlet port 12 and an outlet port 13, and contains an agitator 14 between said ports. The agitator exemplified in Figs. 4 and 6 comprises a shaft 15, provided with projections 16, 17, forming the agitating elements, and shown as rods extending radially from the shaft. They preferably extend through the shaft. They are fixed to the shaft as by being fixed in holes 18 in said shaft. They are shown extending alternately at right angles to each other from said shaft.

The cylinder has a head 21, in which there is a bearing 22, and a gasket 23, with which a follow-up gland 24 coacts about a drive-shaft 25. Bolts 26 extend through flanges 27 on the gland and are threaded into the head for drawing the gland inwardly. An electric motor 29 comprises a rotor, from which a shaft 30 extends. The shaft 30 is direct connected with the drive-shaft 25 by means of a flexible coupling 31, in a hood 32, on a table 33 of the supporting frame 34.

The other end of the cylinder is provided with a head 41, in which there is a bearing 42 for the outer end of the agitator shaft 15.

A yoke 43 extends from the cylinder and is provided with a threaded bearing 44, in which there is a clamp screw 45, the inner end of which is seated in a seat 46 of the head 41 for clamping said head to the cylinder, a gasket 47 being located between said head and the end of the cylinder. The yoke is releasable, as by being provided with lips 48 received about and in rear of a flange 49 extending from the cylinder.

The lower part of the head is provided with a discharge opening 51 normally closed by a threaded plug 52. A discharge shelf 53 is received scoop-wise about the lower part of the outer end of the cylinder for receiving discharge from said discharge opening 51 when the plug 52 is removed, and for directing refuse and cleaning water from the end of the cylinder when its head 41 is removed.

The construction and arrangement of the parts are such that the head 41 may be removed, as by unscrewing the clamp-screw 45 and removing the yoke for permitting endwise removal of the head 41.

There is an endwise releasable coupling 55 between the inner end of the agitator shaft 15 and the drive-shaft 25, shown comprising a collar 56 fixed to the drive-shaft by a pin 57. The drive-shaft has an end slot 58 in which an end lug 59 of the inner reduced end 60 of the agitator shaft is received, the said slot and lug extending crosswise of said shafts so that they rotate together, and the reduced end of the agitator shaft being received in the collar so as to center said shafts with relation to each other.

The outer end of the agitator shaft has a reduced journal 61, received endwise in the bearing 42 of the head 41. A collar 63 is fixed to said reduced end by a set screw 64. The head 41 is releasable endwise from the agitator shaft 15, and the agitator shaft is releasable endwise from the drive-shaft 25, so that, upon release of the head 41, the head and the agitator may be removed endwise away from the cylinder, and may be re-assembled with the cylinder by pushing the agitator shaft endwise into the cylinder for drive connection with the drive-shaft 25, and positioning the outer end of the agitator shaft in its bearing 42 in the head 41.

The head may then be secured in place by replacing the yoke 43 to position it lengthwise with relation to the cylinder and screwing up the clamp-screw 45. The collar 63 insures endwise connection in the coupling 55, and with said coupling holds the agitator shaft in endwise relation in the cylinder. The drive-shaft 25 is held endwise in its bearing by contact of the collar 56 with the bearing 22.

A nipple 71 is screwed to the wall of the inlet port 12, and a nipple 72 is screwed to the wall of the outlet port 13. An inlet valve 73 is screwed to the nipple 71, and an outlet valve 74 is screwed to the nipple 72. A by-pass passage 75 is located between said valves and bypasses the cylinder. It is shown comprising nipples 76, 77, respectively, threaded into the walls of ports 78, 79, of said valves, the nipples being connected by a union couple 80.

A feed pipe 81 connects with the wall of the port 82 of the valve 73, and with the outlet port 83 of a pump 84, and has a union coupling 85 therein. The casing of the pump has an inlet port 86. This pump may be of any suitable construction, and may be a so-called rollator pump or a suitable gear or wing pump for forcing the material through the pipe 81.

It is shown comprising a casing 91 in which a gear 92 rotates, the gear coacting with the inner face of the annular wall of the casing. The teeth of the gear extend endwise. The casing is provided with an end cap 93 secured to the casing by bolts 94. A pinion 95 is journaled on a stud 96 extending inwardly from the cap.

The teeth of the pinion 95 mesh with the teeth of the gear 92, at one side of the latter between the inlet port and the outlet port of the casing. The pinion is eccentric in the gear, a crescent-shaped flange 97 extending from the cap 93 into the gear between the other side of the gear and the pinion. The gear rotates in the direction of the arrow a.

The pump draws the material through its inlet-port 86 and passes the material along both sides of the crescent-shaped flange and discharges the material through the outlet port 83. It creates a vacuum in advance of the pump for drawing the material into the pump.

The material is received from a suitable source, as from a container 101, provided with a discharge opening 102, with the wall of which a pipe 103 connects. This pipe leads into a suitable strainer 104, comprising a straining shell 105, discharging into a discharge passage 106, having an outlet port 107, with which a pipe 108 connects. This pipe connects with the inlet port 86 of the pump.

The strainer is provided with an opening 109, in which a valve 110 is secured. The valve has a threaded outer end, and may receive a suitable connection 111 to a suitable source of a suitable gas or other ingredient intended to be mixed with the material.

The pump sucks the material from the container and delivers it in strained condition to the inlet port of the inlet valve 73, the heavier particles being retained by the strainer. The strainer is readily taken apart for cleaning purposes.

The strainer may comprise the perforate shell 105, one end of which is received in an annular rabbet 112 surrounding the opening 113 in a wall 114 in the casing of the strainer. A cap 116 is at the other end of the shell 105, and the parts are clamped together by a bolt 117 passing through a hole in the end wall 118 of the casing and threaded into the cap.

The pipe 108 is provided with a union coupling 119 and its outer end is threaded into an enlarging fitting 120 threaded into an opening 121 in the end wall of the casing, for ready disassembling of the parts. The opening 121 is of greater diameter than the diameters of the cap 116 and the shell 105.

The shaft 30 is provided with a sprocket wheel 125 rotating therewith. A shaft 126 for the pump is journaled in a bearing 127 of the casing of the pump and a bearing 128 secured to the under face of the table 33. The body of the pump is also secured to the under face of the table.

A sprocket wheel 129 is secured to the pump-shaft. A sprocket-chain 130 is received loopwise about the sprocket wheels for driving the pump. The sprocket-chain extends through a hole 131 in the table into the hood 32, in which the sprocket-wheel 125 is also located.

A packing 132 is arranged to be compressed into the bearing 127 about the shaft 126 by a follower gland 133 for preventing leakage of the material out of the pump. Bolts 134 pass through lugs 135 on the gland and are threaded into the casing of the pump for compressing the packing.

The cylinder is on a base 136, mounted on the table 33, on which the electric motor is also mounted. The pump is fixed to the under side of the table and the bearing 128 is on a depending bracket 137, also fixed to the under side of the table. In this manner the parts are mounted in fixed and closely associated relation.

Each of the valves 73, 74, embraces a movable member, shown as valve plugs 141, 142, respectively, having handles 143, 144, fixed thereto. The handles are connected by a link 145. The link is shown comprising forks 146, 147, respectively received about the handles and pivoted thereto on pins 148, 149. The inner ends of the forks are threaded and receive threaded ends of a rod 150 to form the link, the threaded connections enabling the link to be extended or contracted in length for controlling the relative positions of the valve plugs.

The valves are exemplified as three-way valves. The valve plug 141 has a valve passage 151 and a valve passage 152 communicating therewith. The walls 153, 154, between these passages are narrow in cross-section, so as not to entirely close the ports, and the wall 155 is sufficiently wide to close the respective ports. The outer end of these valve passages are arranged to co-operate with the respective ports of the valve 73 for receiving material from the port 82, and delivering the material selectively either entirely to the port 156, into which the nipple 71 is threaded, or to the port 78, or partially through both said last-named ports for delivering the material in the desired proportions to both the cylinder and the by-pass passage.

The valve plug 142 is provided with a valve passage 161 and with a valve passage 162, communicating therewith. The walls 163, 164 between these passages are narrow in cross-section, so as not to entirely close the ports, and the wall 165 is sufficiently wide to close the respective ports. The outer ends of these passages are arranged to co-operate with the ports of the valve 74 in such manner that discharge through the valve takes place entirely from the cylinder 11 through the port 166, into which the nipple 72 is threaded, or from the by-pass passage through the port 79, or in selective proportions from both the cylinder and the by-pass passage, so as to deliver the material in desired proportions from the same.

The valves are preferably connected so that equal feed and equal delivery will take place through the cylinder, or through the by-pass passage, or in desired proportions between the same. (See Fig. 3.)

During operation one of the valves will suffice to direct the material selectively through the cylinder and through the by-pass passage, but I prefer to employ valves at both ports of the cylinder so that the cylinder may be entirely shut off from the flow of material, as when attention to or taking apart of the cylinder is necessary and it is not desired to stop the flow of the material.

A discharge pipe 169 leads from the discharge port 170 of the valve 74. The discharge pipe has a delivery mouth 171 communicating therewith, shown in a delivery nozzle 172. A valve 173 controls the delivery of treated material through said mouth.

A resistance pipe 175 extends from the discharge pipe 169, and has the purpose of offering resistance to the passage of the material through the discharge passage so that pressure is formed at the discharge mouth for insuring a steady stream of treated material out of the discharge mouth. This resistance pipe is shown as extending upwardly for providing a pressure head on the material. The outer end of this resistance pipe is shown connected with the source of supply, namely, the supply tank 101, in order to deliver any material which may be by-passed from the discharge mouth back to the source of supply for being reconditioned and for re-use.

The mouth 171 is shown in the delivering nozzle 172. The valve 173 controls the delivery of treated material through said mouth. This valve is shown as a three-way valve, the movable element of which is a plug 176, which comprises a valve passage 177, with which a valve passage 178 connects. The valve plug may be so turned and the ends of the valve passages may be so arranged that said valve passages are in full registry with all said ports, which is the relation shown in Fig. 4.

In this relation there is natural flow of the treated material from the valve 173 through the mouth, the flow of the material into the return pipe 175 being resisted by the pressure-head therein. If, however, the pressure of the material reaching the valve 173 should be greater than said normal pressure-head, the material will divide at said valve, part of it going into the pressure-head passage, so as to equalize the pressure at the mouth.

If, on the other hand, there should be a lack of pressure of the material from the valve 74 at the valve 173, there will be flow of material in the pressure head in reverse direction to equalize the desired pressure at the mouth, so that the flow of treated material through the mouth will remain constant and its texture uniform.

The valve 173 may be adjusted to deliver a greater or less volume of material through the mouth, or to shut off the supply of material from said mouth and deliver it to the return pipe.

The nozzle 172 is arranged to deliver the treated material into suitable containers, the mouth end of the nozzle discharging into the openings of the containers. As soon as a container is filled it is moved away from the discharge mouth and another container substituted therefor. The valve 173 may be closed during intervals of changing containers.

The containers may, for instance, be cans arranged to contain given quantities or given weights of the treated material. It is usual to gauge the quantity by weight. For instance, in one pound cans or cans of different capacities, my improved treatment of the material fluffs and homogenizes the material and increases its bulk in permanent form so that it will fill a container of larger cubic contents for a given weight than before treatment, and deliver the treated material with better useful properties and appearance, texture and color.

The nozzle may be provided with a strainer, shown as a perforated plate 181, releasably held in place against an annular shoulder 182 in the wall of the mouth by a wire split ring 183. Nozzles of different sizes may be provided. In Fig. 3 a larger nozzle is exemplified, whereas in Fig. 5 a smaller nozzle is exemplified, having similar parts designated by similar but primed reference numerals.

My improved device improves the appearance and condition of the material acted on. Instancing such material as lard, it may be stated that it is preferred to treat the material while in semi-liquid state or in a state just before congealing, in a range of temperature, for instance, between 80° and 90° F. The agitation to which the material is subjected in my improved device aids in retarding solidification thereof.

As an example, lard contains oil and stearine, the oil having a tendency to separate from the stearine when subjected to heat, as the temperature of a hot day.

My improved device has the quality of so acting on the oil and stearine and other constituents of the lard as to intimately mix them and to so affect their union by agitation as to materially retard their separation and permit the lard to retain the white and fluffy appearance imparted by my improved device even if the treated lard is afterwards subjected to such heat as would ordinarily separate the oil and the stearine constituents thereof.

The agitator of my improved device is rotated at high speed, namely, the speed of an electric motor, direct connected with the agitating element, which may be exemplified as a motor of two horse power, the rotor of which rotates approximately 1800 R. P. M. The cylinder may be exemplified as having an inside length of sixteen inches and an inside diameter of five inches, in which there is a one inch shaft, having quarter inch rods therein alternately at right angles in the shaft and spaced three-fourths of an inch apart on centers, and leaving a net cubic contents of the cylinder approximately three hundred cubic inches.

This example is given as an illustration and not as a limitation, and is given as an advisable proportion of agitator capacity with relation to the cubic contents of the cylinder. The pump may be exemplified as having a feeding capacity of twenty gallons per minute, from which the speed of feed of the material through the cylinder will be approximately an equal amount. This is also an example and not a limitation. Other speeds and proportions in sizes may be employed, without departing from the spirit of my invention.

The material is subjected to extreme agitation in the cylinder and is whipped therein, so as to thoroughly intermingle and intimately associate the constituents of the material, and to render the same fluffy and velvety, and to bleach the material and to render the same homogeneous.

If it is desired to add air, nitrogen or other inert gas, or other ingredient into the material for agitating the same therewith, this may be readily done in desired proportion through the valve 110, the added ingredient being sucked through the valve and mixed with the material on its way to the pump, in the present instance.

My improved device improves the appearance of the material, and, in the case of lard, adds to its shortening value when using the lard as a shortening agent, and improves its quality in other respects, and improves its commercial value.

I have in Figs. 9, 10 and 11 exemplified a modification in which similar parts are designated by similar but primed reference numerals.

The chamber or cylinder 11' has a shaft 15' therein journaled in bearings 22', 42'. There is an inlet opening or port 12' and an outlet opening or port 13', nipples 71', 72' extending from these openings. The mechanisms connecting with these nipples, with the cylinder and for driving the shaft may be the same as those shown and described in connection with Figs. 1 to 8 inclusive.

In this modification the shaft is provided with agitating and feeding vanes 185, 186, the feeding vanes 185 being shown extending from a hub 187 secured to said shaft by a pin 188 and the vanes 186 being shown extending from a hub 189 secured to the shaft by a pin 190.

The vanes are of such curvature that their rotation causes feeding movement of the material through the cylinder in the direction of the arrow shown in Fig. 11. The direction of rotation is indicated by arrows. The vanes 185 are preferably adjacent to the port 12, and the vanes 186 are preferably adjacent to the port 13, for aiding in feeding the material through said ports. Agitating pins 16', 17' are fixed to the shaft between the vanes.

The vanes may be provided with agitating means, exemplified as passages 191. These passages are shown as holes whose axes extend parallel with the axis of rotation of the shaft 15'. As the vane rotates in the direction of the arrow (Fig. 11), the portion 192 of the wall extending beyond the body of the vane in advance thereof of said passage contacts the material, and displaces a portion of the material, which is forced through the passage and aids in agitating and swirling the material, this movement of the material being in a direction counter or opposite to the direction of feeding movement of the material caused by the body of the vane. The rotation of the vanes is rapid.

The agitation of the material thus caused aids in fluffing and homogenizing the same, and in thoroughly mixing the material.

The vanes may be provided with agitating means, or, if desired, such agitating means may be omitted, one of the vanes 185 in Fig. 9 showing no such agitating means.

Having thus fully described my invention, what I claim as new and desire to secure by Letters Patent, is:

1. In a machine for treating material, the combination of a supply passage, a discharge passage, a cylinder between said passages, an agitator in said cylinder, a by-pass passage between said supply passage and said discharge passage by-passing said cylinder, said supply passage communicating with similar ends of said cylinder and said by-pass passage, and said discharge passage communicating with the opposite ends of said cylinder and said by-pass passage, for passage of the material in similar directions through said cylinder and said by-pass passage, and a valve between said supply passage and said discharge passage for controlling the passage of material selectively through said by-pass passage and said cylinder.

2. In a machine for treating material, the combination of a supply passage, a discharge passage, a cylinder between said passages, an agitator in said cylinder, a by-pass passage between said supply passage and said discharge passage, a valve between said supply passage and said discharge passage for controlling the passage of material selectively through said by-pass passage and said cylinder, a discharge mouth for said discharge passage, and a resistance passage extending beyond said discharge mouth and supplying resistance upon the material at said discharge mouth resisting passage of the material into said resistance passage and cushioning the discharge of material through said mouth.

3. In a machine for treating material, the combination of a supply passage, a discharge passage, a cylinder between said passages, an agitator in said cylinder, a storage container for the material with which said supply passage has connection, a discharge mouth for said discharge passage, a cushioning resistance passage free of propelling means for the material and extending upwardly between and having communication with said mouth and said storage container for return of material to said storage container and for gravity resistance on the material in said resistance passage below said storage container to cushioningly equalize discharge of material from said mouth, and valve means between said passages controlling the passage of material through said cylinder and said mouth and the return of material to said container.

4. In a machine for treating material, the combination of a cylinder, said cylinder having an inlet port and an outlet port, an agitator in said cylinder between said ports, a feed passage for said inlet port, a discharge passage for said outlet port, a valve between said feed passage and said inlet port, a valve between said discharge passage and said outlet port, and a by-pass passage between said valves by-passing said cylinder, said feed-passage having communication with proximate ends of said cylinder and said by-pass passage, and said discharge passage having communication with the opposite ends of said cylinder and said by-pass passage, and feeding material through both said cylinder and said by-pass passage in similar directions, said valves selectively controlling the passage of material through said cylinder and said by-pass passage.

5. In a machine for treating material, the combination of a cylinder, said cylinder having an inlet port and an outlet port, an agitator in said cylinder between said ports, a feed passage for said inlet port, a discharge passage for said outlet port, a valve between said feed passage and said inlet port, a valve between said discharge passage and said outlet port, a by-pass passage between said valves by-passing said cylinder, said valves arranged for closing said respective ports and said by-pass passage and for adjustably opening said respective ports and said by-pass passage whereby to selectively pass material through said cylinder and said by-pass passage, and means connecting said valves for combined movements.

6. In a machine for treating material, the combination of a cylinder, said cylinder provided with an inlet port and an outlet port, an agitator in said cylinder between said ports, means for rotating said agitator at high speed, and arranged for whipping material passing through said cylinder to fluff and homogenize said material, a delivery passage extending above said outlet port to form gravity pressure on the material in said cylinder, and a delivery outlet in the lower portion of said delivery passage, said delivery passage extending above said delivery outlet for gravity pressure upon the material at said delivery outlet.

7. In a machine for treating material, the combination of a cylinder, said cylinder provided with an inlet port and an outlet port, an agitator in said cylinder, means for rotating said agitator at high speed to whip the material passing through said cylinder for fluffing and homogenizing said material, a by-pass passage between said ports, valves between said by-pass passage and said respective ports whereby to control selective passage of the material through said cylinder and said by-pass passage, a source of supply for the material having connection with said valve for said inlet-port, a delivery mouth for the material having connection with said valve for said outlet port, a pressure creating passage for the material having communication with said delivery mouth to provide a pressure head on the material at said delivery mouth and having communication with said source of supply to return material thereto, and a valve for said delivery mouth, and constructed and arranged whereby to selectively pass the material through said cylinder and said by-pass passage and through said delivery mouth and said pressure creating passage.

8. In a machine for treating material, the combination of a cylinder, said cylinder provided with an inlet port and an outlet port, an agitator in said cylinder between said ports, means for rotating said agitator at high speed to fluff and homogenize the material passing through said cylinder, a by-pass passage between said ports to by-pass said cylinder, valves between said by-pass passage and said respective ports, a feed passage for material communicating with said valve for said inlet port, a delivery passage for the material communicating with said valve for said outlet port, and means for simultaneously moving said valves, whereby to control selective passage of the material through said cylinder and said by-pass passage and deliver agitated and unagitated material in various proportions to said delivery passage.

9. In a machine for treating material, the combination of a cylinder, said cylinder provided with an inlet port and an outlet port, an agitator in said cylinder between said ports, means for rotating said agitator at high speed to fluff and homogenize the material passing through said cylinder, a by-pass passage between said ports to by-pass said cylinder, valves between said by-pass passage and said respective ports, a feed passage for material communicating with said valve for said inlet port, an inlet for feeding a qualifying agent into said material, a delivery passage for the material communicating with said valve for said outlet port, and means for simultaneously moving said valves, whereby to control selective passage of the material through said cylinder and said by-pass passage and deliver agitated and unagitated material in various proportions to said delivery passage.

10. In a machine for treating material, the combination of a source of pressure supply for the material, a discharge mouth for the material, an agitating chamber containing agitating means for the material between said source of pressure supply and said discharge mouth, a by-pass passage between said same source of pressure supply for the material and said discharge mouth in advance of said agitating chamber to divert material from said source of pressure supply away from said agitating chamber to said discharge mouth, and valve means controlling passage of the material selectively through said by-pass passage and said agitating chamber to said discharge mouth.

11. In a machine for treating material, the combination of a source of pressure supply for the material, a discharge mouth for the material, an agitating chamber containing agitating means for the material between said source of pressure supply and said discharge mouth, a by-pass passage between said source of pressure supply and said discharge mouth in advance of said agitating chamber to divert material away from said agitating chamber, valve means controlling passage of the material selectively through said by-pass passage and said agitating chamber, a resistance passage for the material extending upwardly from said mouth to cushion the material at said mouth, and a valve at said mouth controlling the passage of material selectively through said mouth and said resistance passage.

12. In a machine for treating material, the combination of a source of material, a chamber for the material, an agitator therein for agitating the material, a by-pass passage for the material from said source diverting the material away from said chamber, pumping means for the material having separate communications with said chamber and said by-pass passage solely at one end of said chamber and said by-pass passage, a delivery passage for the material having separate communications with said container and said by-pass passage solely at the other end of said chamber and said by-pass passage, said by-pass passage being located between said pumping means and said delivery passage in advance of said chamber to divert material passing from said source between said pumping means and said delivery passage away from said chamber so as to be free of entry into said chamber, and valve means controlling passage of material from said source selectively through said by-pass passage and said chamber.

13. In a machine for treating material, the combination of a source of material, a chamber for the material, an agitator therein for agitating the material, a by-pass passage for the material diverting material from said source away from said chamber so as to be free of entry into said chamber, pumping means for the material from said source solely at one end of said by-pass passage and said chamber whereby to force the material from said source through said by-pass passage and through said chamber, a delivery passage for the material solely at the other end of said by-pass passage and said chamber for discharging the material from both said by-pass passage and said chamber, said by-pass passage being located between said pumping means and said delivery passage in advance of said chamber whereby to divert material therethrough away from said chamber, and valve means controlling passage of the material from said source selectively through said by-pass passage and said chamber.

14. In a machine for treating material, the combination of a chamber for the material, an agitator therein for agitating the material, a by-pass passage for the material diverting the material from entry into said chamber, a source of pressure supply for the material communicating with one of the ends of said by-pass passage and said chamber, said communication with said by-pass passage being in advance of said communication with said chamber, a delivery passage for the material solely at the other of the ends of said by-pass passage and said chamber for discharging the material from both said by-pass passage and said chamber, and valve means controlling passage of the material selectively through said by-pass passage and through said chamber, the path of the material between points spaced equally from the respective ends of said by-pass passage being shorter through said by-pass passage than through said chamber.

15. In a machine for treating material, the combination of a chamber for the material, an agitator therein for agitating the material, a by-pass passage for the material diverting the material from entry into said chamber, a source of pressure supply for the material communicating with one of the ends of said by-pass passage and said chamber, said communication with said by-pass passage being in advance of said communication with said chamber, a delivery passage for the material solely at the other of the ends of said by-pass passage and said chamber for discharging the material from both said by-pass passage and said chamber, valve means controlling passage of the material selectively through said by-pass passage and through said chamber, the path of the material between points spaced equally from the respective ends of said by-pass passage being shorter through said by-pass passage than through said chamber, a delivery mouth in said delivery passage, said delivery passage having an extension extending upwardly beyond said mouth, and a valve at said mouth whereby to selectively control discharge of the material through said mouth and the passage of the material along said extension of said delivery passage.

16. In a machine for treating material, the combination of a chamber for the material, an agitator therein to fluff and homogenize the material in said chamber, a by-pass passage by-passing said chamber, a delivery mouth for the material having communication with said by-pass passage and said chamber in the order named to receive material therefrom, a source of pressure supply for the material having communication with said by-pass passage and said chamber in the order named to feed material through said by-pass passage and said chamber in the order named toward said delivery mouth, the communication between said by-pass passage and said source of pressure supply and delivery mouth being in advance of the communication of said chamber with said source of pressure supply and said delivery mouth, and valve means selectively controlling the passage of the material through said by-pass passage and through said chamber toward said delivery mouth.

17. In a machine for treating material, the combination of a chamber for the material, an agitator therein to fluff and homogenize the material in said chamber, a by-pass passage by-passing said chamber, a delivery mouth for the material having communication with said by-pass passage and said chamber in the order named to receive material therefrom, a source of pressure supply for the material having communication with said by-pass passage and said chamber in the order named to feed material through said by-pass passage and said chamber in the order named toward said delivery mouth, the communication between said by-pass passage and said source of pressure supply and delivery mouth being in advance of the communication of said chamber with said source of pressure supply and said delivery mouth, valve means selectively controlling the passage of the material through said by-pass passage and through said chamber toward said delivery mouth, a return passage for the material between said delivery mouth and said source of pressure supply, and valve means for said mouth selectively controlling the passage of material through said mouth and through said return passage.

18. In a machine for treating material, the combination of a source of material, a chamber for the material, an agitator therein for agitating the material, a by-pass passage for material from said source by-passing said chamber, a feed passage for material from said source having communication with one of the ends of both said chamber and said by-pass passage feeding material from said source therethrough in similar directions, a delivery passage for the material having communication with the other of the ends of both said chamber and said by-pass passage receiving material therefrom in similar directions, and valve means selectively controlling the passage of material from said same source through said by-pass passage and said chamber for selective delivery of material from said same source to said delivery passage through said by-pass passage and through said chamber.

19. In a machine for treating material, the combination of a chamber for the material, an agitator therein for agitating the material, a by-pass passage for the material by-passing said chamber, a feed passage for the material having communication with one of the ends of both said chamber and said by-pass passage feeding material therethrough in similar directions, a delivery passage for the material having communication with the other of the ends of both said chamber and said by-pass passage receiving material therefrom in similar directions, valve means for said by-pass passage and said chamber selectively controlling the passage of material through said by-pass passage and said chamber for selective delivery of material to said delivery passage through said by-pass passage and through said chamber, a mouth for said delivery passage, an extension for said delivery passage extending upwardly above said mouth for gravity cushioning pressure upon the material at said mouth, and a valve at said mouth to selectively control the feeding of material through said mouth and along said extension.

OSCAR C. SCHMIDT.